US012142832B2

(12) United States Patent
Chazelas et al.

(10) Patent No.: US 12,142,832 B2
(45) Date of Patent: Nov. 12, 2024

(54) METASURFACE DEVICE

(71) Applicants: ULTIMETAS, Paris (FR); PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR); SORBONNE UNIVERSITE, Paris (FR)

(72) Inventors: Jean Chazelas, Paris (FR); Charlotte Tripon-Canseliet, Issy les Moulineaux (FR)

(73) Assignees: ULTIMETAS, Paris (FR); PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR); SORBONNE UNIVERSITE, Paris (FR)

( * ) Notice: Subject to any disclaimer, the term of this patent is extended or adjusted under 35 U.S.C. 154(b) by 172 days.

(21) Appl. No.: 18/017,852

(22) PCT Filed: Jul. 20, 2021

(86) PCT No.: PCT/EP2021/070288
§ 371 (c)(1),
(2) Date: Jan. 24, 2023

(87) PCT Pub. No.: WO2022/023125
PCT Pub. Date: Feb. 3, 2022

(65) Prior Publication Data

US 2023/0275356 A1 Aug. 31, 2023

(30) Foreign Application Priority Data

Jul. 30, 2020 (FR) ...................................... 2008095

(51) Int. Cl.
*H01Q 15/00* (2006.01)
*H01Q 3/24* (2006.01)
*H01Q 3/26* (2006.01)

(52) U.S. Cl.
CPC ......... *H01Q 15/0086* (2013.01); *H01Q 3/247* (2013.01); *H01Q 3/2676* (2013.01)

(58) Field of Classification Search
CPC ... H01Q 15/0086; H01Q 3/247; H01Q 3/2676
See application file for complete search history.

(56) References Cited

U.S. PATENT DOCUMENTS 6,175,332 B1 * 1/2001 Fedors ..................... H01Q 1/38 343/846
8,223,423 B2 * 7/2012 Haberfelde ............. G02F 1/015 359/263

(Continued)

FOREIGN PATENT DOCUMENTS

GB 2624105 A * 5/2024 ............. H01Q 13/20
WO 2019/219708 A1 11/2019

*Primary Examiner* — Seokjin Kim
(74) *Attorney, Agent, or Firm* — BakerHostetler

(57) ABSTRACT

A metasurface device includes a ground structure able to have a ground plane function, the ground structure being able to be alternately in an insulating state, wherein it prevents the propagation of the surface wave over the front surface of a substrate so as to prevent the antenna element from radiating, and in a conductive state, wherein the ground structure has the ground plane function, allowing the propagation of the surface wave over the front surface of the substrate from the emission/reception device to the conductive patches, or vice versa, the ground structure being able to change from the insulating state to the conductive state (Continued)

through illumination of the ground structure at a wavelength called a switching wavelength.

10 Claims, 9 Drawing Sheets

(56) References Cited

U.S. PATENT DOCUMENTS

| | | | | |
|---|---|---|---|---|
| 9,711,852 | B2 * | 7/2017 | Chen | H01Q 3/44 |
| 10,186,771 | B2 * | 1/2019 | Bowden | H01Q 1/36 |
| 2018/0219628 | A1 * | 8/2018 | Makurin | H01Q 3/44 |
| 2020/0266533 | A1 * | 8/2020 | McCandless | H01Q 1/52 |
| 2021/0203077 | A1 * | 7/2021 | Tripon-Canseliet | H01Q 15/0086 |
| 2021/0367341 | A1 * | 11/2021 | Hasan Abadi | H01Q 21/065 |
| 2023/0268633 | A1 * | 8/2023 | Chazelas | H01Q 1/24 455/90.3 |

* cited by examiner

METASURFACE DEVICE

CROSS-REFERENCE TO RELATED APPLICATIONS

This application is a National Stage of International patent application PCT/EP2021/070288, filed on Jul. 20, 2021, which claims priority to foreign French patent application No. FR 2008095, filed on Jul. 30, 2020, the disclosures of which are incorporated by reference in their entirety.

FIELD OF THE INVENTION

The field of the invention is that of metasurface devices, for example metasurface antennas. The invention is applicable to microwave devices.

BACKGROUND

Such devices may be used in various applications, such as radar applications in avionics and aerospace, high-speed communication and space telecommunications.

Patent application WO2019219708 discloses an antenna device comprising a substrate, a ground plane formed on a rear surface of the substrate and an antenna element formed on the front surface of the substrate and comprising a first array of conductive patches separated by switches arranged between the conductive patches. The antenna device comprises an electromagnetic-wave source configured and arranged to generate a surface wave on the front face of the substrate. The surface wave is transformed by the two-dimensional array of conductive patches into leaky waves that are emitted in a direction having a component perpendicular to the front surface of the substrate. The electrical connection of certain conductive patches to one another makes it possible to form an array of groups of patches that are connected to one another. This solution makes it possible, without using phase shifters, to control the main direction of the emission pattern of the antenna and therefore to produce electronically scanned antennas at a low cost.

There is a need to propose such metasurface devices having good temporal precision so as, for example, to make it possible to measure distances with good precision when the metasurface device is used in radar mode.

SUMMARY OF THE INVENTION

One aim of the invention is to propose a metasurface antenna device that makes it possible to obtain good temporal precision.

To this end, the subject of the invention is a metasurface device comprising: a substrate having a rear surface and a front surface;

- an emission and/or reception device able to emit and/or receive an electromagnetic wave, configured and arranged such that the wave is able to propagate in the form of a surface wave over the front surface of the substrate,
- an antenna element comprising a two-dimensional array of conductive patches arranged on the front surface of the substrate, spaced from one another and having dimensions smaller than the operating wavelength of the emission and/or reception device,
- the substrate comprising a ground structure able to have a ground plane function, the ground structure being able to be alternately in an insulating state, in which it prevents the propagation of the surface wave over the front surface of the substrate, from the emission and/or reception device to the conductive patches, or vice versa, and in a conductive state, in which the ground structure has the ground plane function, allowing the propagation of the surface wave over the front surface of the substrate, from the emission/reception device to the conductive patches, or vice versa, the ground structure being able to change from the insulating state to the conductive state through illumination of the ground structure at a wavelength called a switching wavelength.

When the ground structure has a ground plane allowing the surface wave to propagate from the emission/reception device to the conductive patches or vice versa, the antenna element is able to reflect or transform the surface wave so as to radiate in a direction having a component perpendicular to the front surface of the substrate (in emission mode) or to reflect or transform a wave received on the front surface of the substrate so as to transform it into a surface wave (in reception mode).

Advantageously, the metasurface device comprises a switching source able to change from a state in which it does not illuminate the ground structure, such that the ground structure is in the insulating state, to a state in which it illuminates the ground structure, such that the ground structure is in the conductive state.

In a first embodiment, the substrate comprises a ground layer and an intermediate layer that insulates the ground plane from the conductive patches when the ground structure has the ground plane function, the ground structure comprising a photoconductive central portion and a conductive peripheral portion surrounding the photoconductive central portion, the photoconductive central portion being in an insulating state, when it is not illuminated, in which it prevents the propagation of the surface wave from the emission and/or reception device to the conductive patches, or vice versa, the photoconductive central portion being able to be in a conductive state, when it is illuminated at the switching wavelength, in which the photoconductive central portion is conductive, such that the ground structure has the ground plane function.

In a first example, the ground structure is a ground layer, the intermediate layer being interposed between the conductive patches and the ground layer.

In a second example, the intermediate layer is made of a photoconductive semiconductor material able to be in a conductive state when it is illuminated at the switching wavelength, the intermediate layer being interposed between the conductive patches and the conductive peripheral portion, the photoconductive central portion comprising a central portion of a rear face of the intermediate layer, the rear face of the intermediate layer being in direct physical contact with the conductive peripheral portion.

In one particular example, the device comprises a plurality of switching sources, the ground structure comprising a plurality of photoconductive central portions and a switch for selectively illuminating only one of the photoconductive central portions taken from among the photoconductive central portions and/or for simultaneously and selectively illuminating a plurality of photoconductive central portions.

In a second embodiment, the ground structure is a first photoconductive layer made of a single photoconductive semiconductor material, the photoconductive material being insulating when it is not illuminated and conductive when it is illuminated at the switching wavelength.

Advantageously, the photoconductive semiconductor material forming the first photoconductive layer is chosen such that the first photoconductive layer has a depth of penetration less than the thickness of the first photoconductive layer at the switching wavelength, such that, when the entire rear face of the first photoconductive layer is illuminated at the switching wavelength by the switching source, the first photoconductive layer comprises:

a conductive section forming the ground plane and extending from the rear face of the semiconductor layer over a thickness less than the thickness of the first semiconductor layer, and an insulating section extending over the rest of the thickness of the semiconductor layer such that the conductive section is insulated from the conductive patches by the insulating section.

Advantageously, the metasurface device comprises a semiconductor intermediate layer, the metasurface device comprising an optical reconfiguration device comprising what is called a reconfiguration source emitting an optical beam and a diffractive optical device able to illuminate a set of at least one area, called illuminated area, of the intermediate layer such that the intermediate layer is conductive only in the set of at least one illuminated area, so as to electrically connect, in pairs, the metal patches of the antenna element that are separate and connected by a continuous area of the intermediate layer that is located completely within an illuminated area of the set of at least one illuminated area so as to form at least one group of conductive patches (4) that are electrically connected to one another.

Advantageously, the intermediate layer is interposed between the ground layer and the conductive patches. As a variant, the intermediate layer is the ground layer.

The metasurface device according to the invention has the advantage of providing optical control for the generation of the ground plane. This control is therefore independent of the control of the electromagnetic-wave source for exciting the metasurface (or the antenna element) and therefore the signal radiated by the metasurface device.

The temporal precision of optical control is better than that of electrical control. This solution therefore makes it possible to obtain very good temporal precision with regard to a time at which the metasurface device is turned on or off and therefore with regard to a time at which electromagnetic radiation is emitted. Indeed, the antenna radiates only when the ground structure is illuminated so as to create the ground plane.

This temporal precision makes it possible to carry out precise measurements, for example for radar applications or in telecommunications. It makes it possible for example to obtain good precision with regard to the measurement of the round-trip time of the wave emitted to the illuminated object.

The optical control of the ground plane may also be decorrelated from other optical control so as to selectively electrically connect the conductive patches of the metasurface in order to configure the antenna element, for example, to adjust the scale of the metasurface, that is to say the pitch of the antenna elements of the metasurface.

BRIEF DESCRIPTION OF THE DRAWINGS

Other features, details and advantages of the invention will become apparent upon reading the description, given with reference to the appended drawings, which are given by way of example and in which, respectively.

The same elements are identified by the same references from one figure to another.

DETAILED DESCRIPTION

In the remainder of the text, conductive is understood to mean electrically conductive and insulating is understood to mean electrically insulating.

An optical beam is understood to mean a beam whose wavelength is located in the optical domain comprising the infrared, the ultraviolet and the visible.

Figure 1:
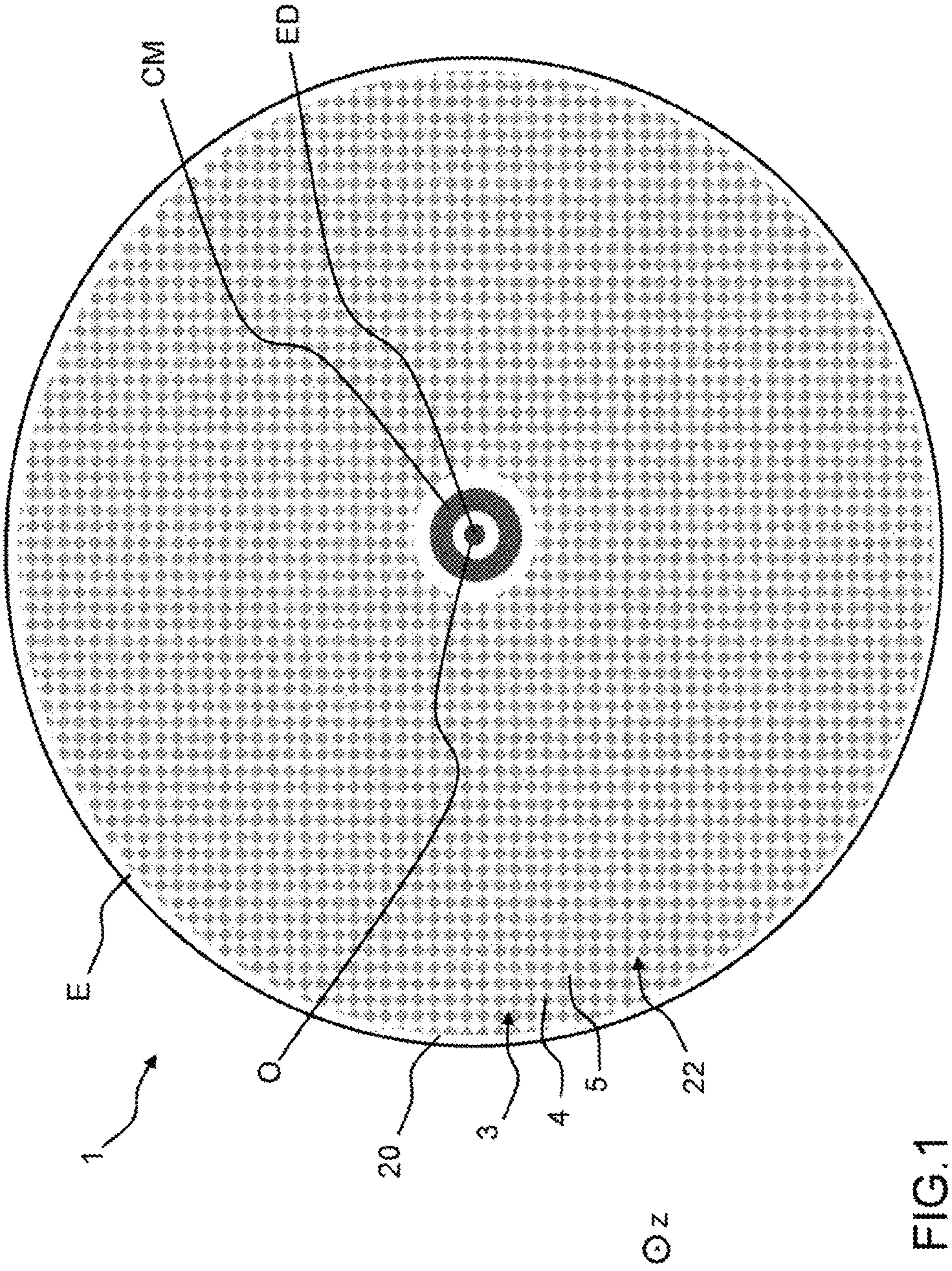
FIG. 1 schematically illustrates a plan view of a first example of a metasurface device according to a first embodiment of the invention, FIG. 2 schematically illustrates, more precisely, a portion of the antenna element of the device of FIG. 1, in a plan view, a first example of a metasurface device according to a first mode, FIG. 3 schematically illustrates another example of an antenna element, FIG. 4 schematically illustrates a sectional view of the device of FIG. 1, FIG. 5 schematically illustrates a bottom view of the device of FIG. 1, FIG. 6 schematically illustrates a sectional view of a second example of the device according to the first embodiment of the invention, FIG. 7 schematically illustrates a sectional view of a third example of the device according to the first embodiment of the invention, FIG. 8 schematically illustrates a sectional view of a metasurface device according to a second embodiment, FIG. 9 schematically illustrates an exploded view of the metasurface device of FIG. 8.

FIG. 1 schematically illustrates a plan view of a metasurface device 1 according to the invention.

The metasurface device 1 comprises a stack E of layers stacked along a stacking axis z perpendicular to the plane of FIG. 1. The stack comprises a substrate 2, a conductive central ring CM and an antenna element 3 formed around the conductive central ring CM. The conductive central ring CM is spaced from a central channel O and from the antenna element 3.

The antenna element 3 comprises a two-dimensional periodic array of conductive patches 4 arranged on the front surface of the substrate.

The conductive patches 4 are spaced from one another. The conductive patches 4 are separated by openings 5. The antenna element 3 constitutes a metasurface.

The conductive patches 4 are for example patches made of metal or indium tin oxide (ITO), just like the metal ring CM.

The conductive patches 4 and the openings 5 are substantially self-complementary. Unlike a metasurface consisting of conductive patches 4 and of openings 5 that are strictly self-complementary, the conductive patches 4 of the antenna element 3 are separated from one another, as may be seen in FIG. 2, which shows a portion of the antenna element or metasurface 3.

In other words, the closest points of two adjacent conductive patches 4 are separated by a gap 6. The openings 5 are therefore larger than the conductive patches 4.

The antenna element 3 therefore comprises gaps 6 separating the patches that are adjacent in terms of their adjacent vertices.

In the non-limiting example of FIG. 1, the antenna element 3 has substantially a checkerboard structure. The openings 5 and the conductive patches 4 are substantially square in shape.

The conductive patches 4 may have a strictly square shape or a substantially square shape with clipped or flattened vertices. They may have a different shape, such as for example an oval or rounded shape.

The conductive patches 4 have sub-wavelength sides or dimensions. The same applies for the pitch of the array.

Advantageously, the conductive patches 4 have dimensions or sides of lengths less than or equal to λ/50, and preferably between λ/50 and λ/100. A is the operating wavelength of the metasurface device, that is to say of the wave radiated by the antenna element 3.

The size of the gap 6, that is to say the minimum distance between two adjacent patches, which may be the distance between two vertices of two adjacent conductive patches 4, is between λ/1000 and λ/2000. For an antenna operating at the frequency 30 GHz, the wavelength is approximately 10 mm in air, the sides of the patches have a length of between 100 and 200 μm and the distance between patches 4 that are adjacent in terms of their vertices is between 5 and 10 μm.

Other metasurfaces comprising conductive patches 4 and substantially self-complementary openings 5 are conceivable. The patches 4 and/or the openings 5 may for example have substantially shapes of equilateral triangles, crosses or ovals. The conductive patches are thus arranged in rows and columns. The columns may or may not be perpendicular in relation to the columns.

In the example of FIG. 1, the conductive patches 4 all have one and the same orientation in a two-dimensional reference frame tied to the front face of the substrate. As a variant, some conductive patches may have different orientations in a two-dimensional reference frame tied to the front face of the substrate.

In the example of FIG. 1, the conductive patches 4 all have one and the same shape and the same dimensions. As a variant, some conductive patches have different shapes and/or different dimensions.

Figure 3:
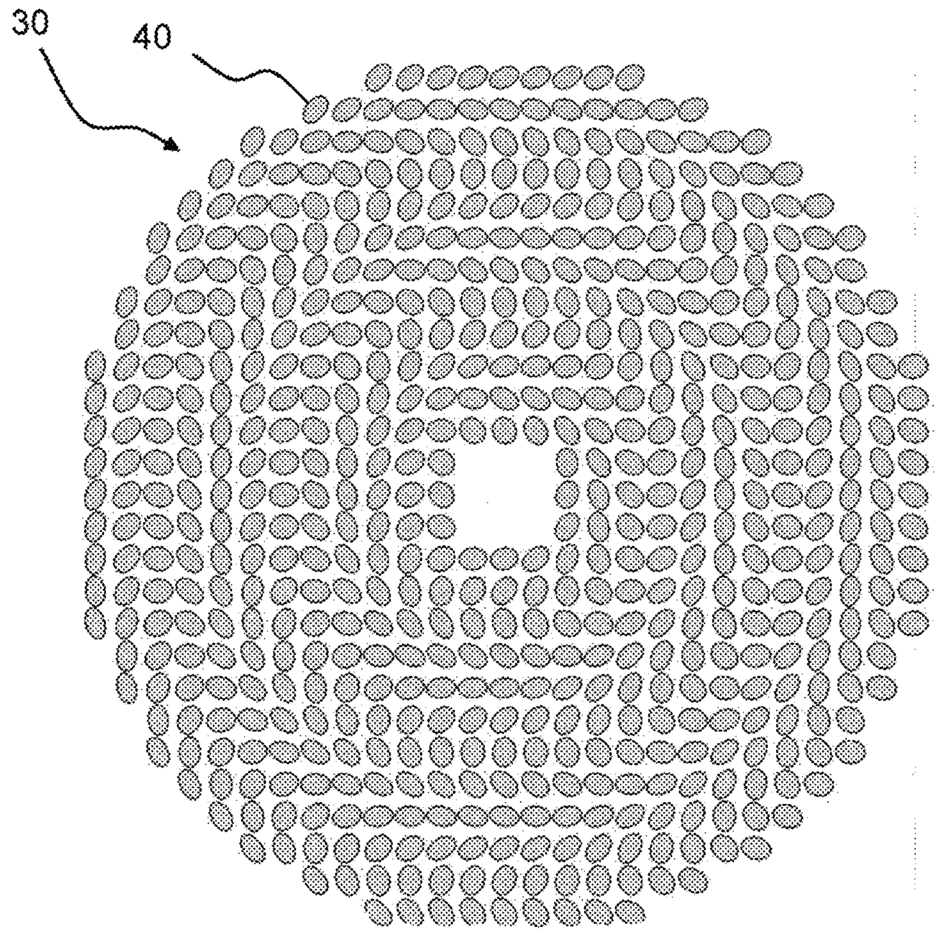

FIG. 3 shows a metasurface 30 in which the conductive patches 40 have substantially an oval shape. The conductive patches are not all identical. Some conductive patches differ from other conductive patches in terms of their shapes and their orientations in a two-dimensional reference frame tied to the front face of the substrate.

The selective electrical connection between conductive patches 4 makes it possible to form a reconfigurable antenna element 3, that is to say one able to exhibit different radiation patterns based on one and the same excitation. This makes it possible for example to obtain a multi-scale antenna element that may comprise a two-dimensional array of conductive patches that are electrically insulated from one another or a two-dimensional array of groups of conductive patches that are electrically connected to one another, as will be seen below.

Figure 4:
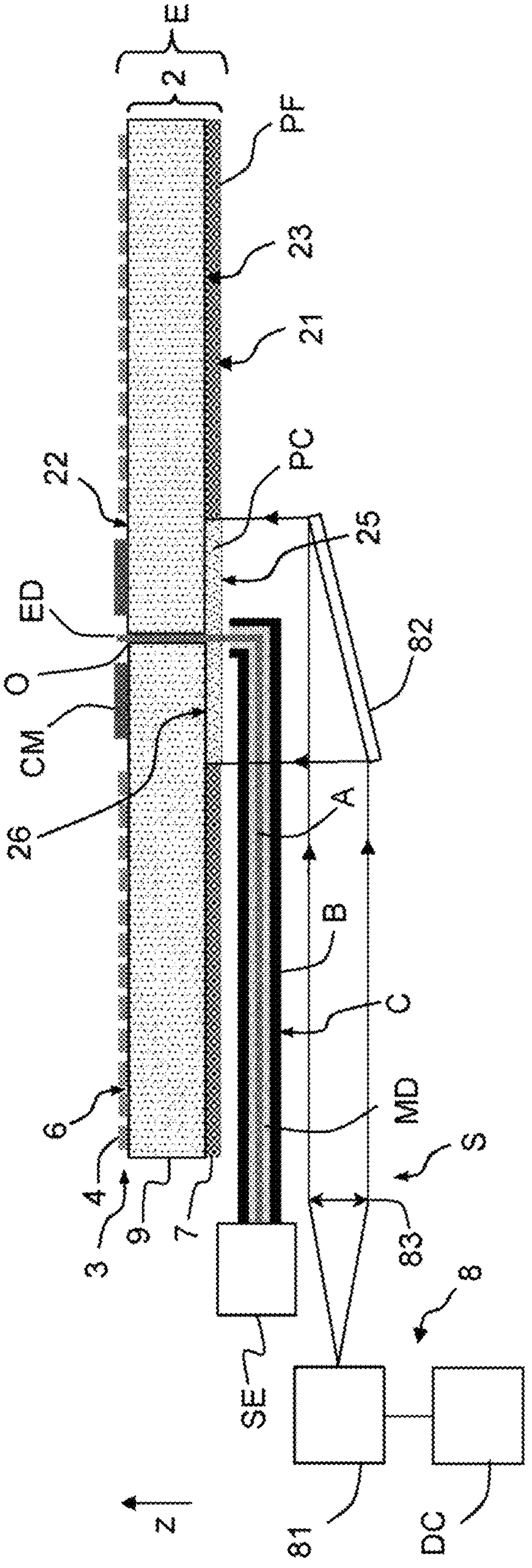
Figure 5:
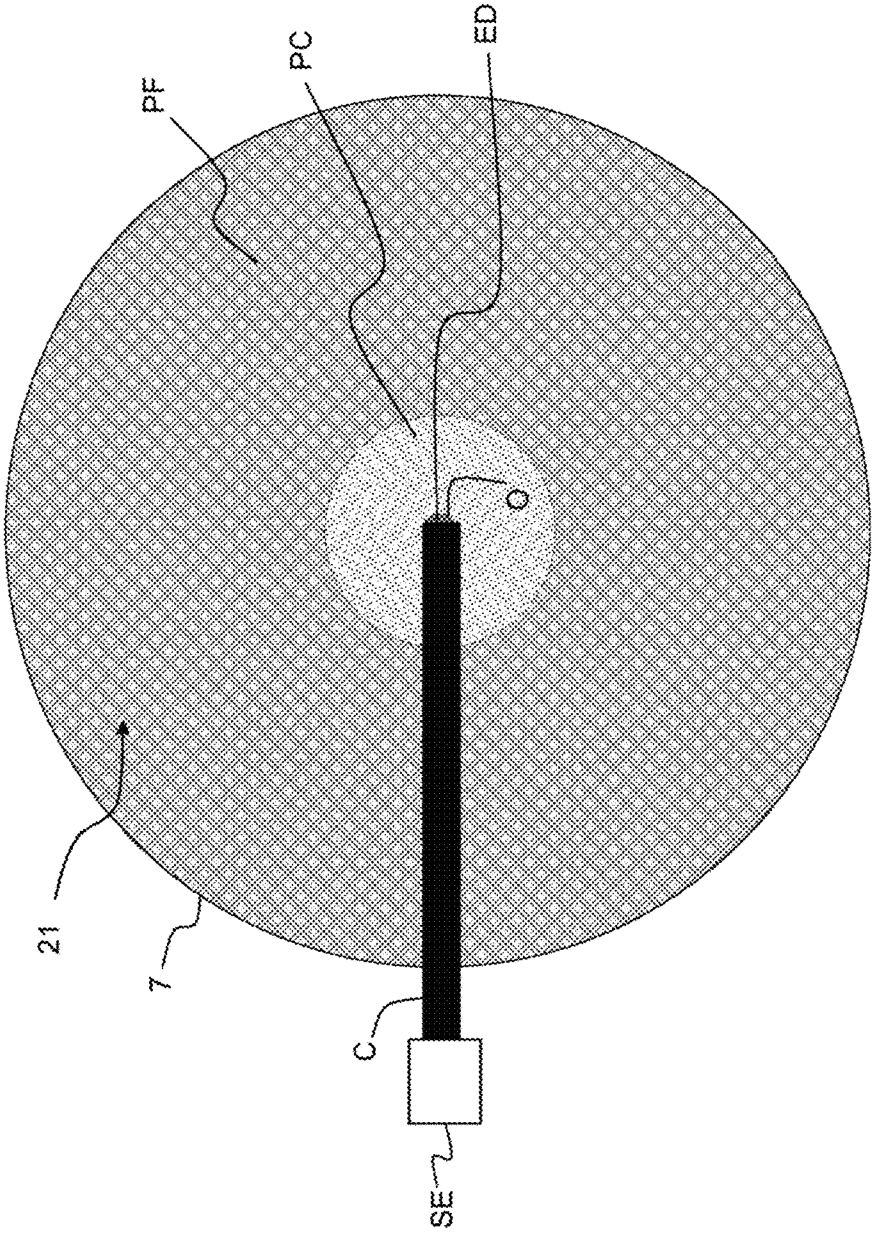

FIG. 4 schematically illustrates a sectional view of the metasurface device 1 of FIG. 1, forming a first example of a metasurface device according to a first embodiment of the invention. FIG. 5 is a schematic rear view of the same device.

The metasurface device comprises a source S for emitting electromagnetic waves (not visible in FIG. 1) and configured and arranged so as to generate surface waves on the front surface 22 of the substrate 2.

The source is advantageously isotropic.

The source advantageously makes it possible to emit spherical or cylindrical electromagnetic waves. The source comprises, for example, a monopole.

The electromagnetic waves are preferably microwaves, preferably microwave-frequency waves. The metasurface device is for example an antenna, for example a microwave antenna.

The metasurface device 1 comprises a channel O passing through the stack E along the axis z.

The source S comprises for example a coaxial cable C comprising a conductive central core A, surrounded by a dielectric material MD that is itself surrounded by a shield B. The source S also comprises an electrical source SE able to generate a microwave electrical signal that is transmitted, by the coaxial cable C, to one end ED of the central core A.

The exposed end ED passes through the substrate 2 and extends facing the metal ring CM.

The portion of the exposed end ED extending facing the antenna element 3 forms a monopole that radiates an electromagnetic wave the majority of which is diffused toward the antenna element 3 and propagates over the front face of the substrate 2 in the form of a surface wave. The rest of the wave emitted by the exposed end ED is transmitted into free space.

The antenna element 3, regardless of its scale, reflects or transforms the surface wave emitted over the front surface 22 of the substrate 2 so as to radiate, at the wavelength of the electromagnetic wave, in a direction having a component perpendicular to the front surface 22 of the substrate 2, that is to say it has a component along the axis z. The total wave radiated by the antenna element results from a recombination of the leaky waves reflected or transformed by the various conductive patches, regardless of the scale of the antenna element, that is to say even when the conductive patches 4 are electrically insulated from one another. The interference between the leaky waves radiated by the various conductive patches is radiated in a direction having a component along the axis z.

Advantageously, the central ring CM is configured and arranged to optimize the coupling rate between the wave generated by the antenna element 3 at a predetermined frequency. The configuration of the central ring CM depends on the frequency of the wave generated by the monopole ED.

The antennas are conventionally circular as in FIG. 1, but may have another geometric shape, such as for example a rectangular shape, for example a square shape.

The substrate 2 comprises a ground layer 7 able to have a ground plane function.

The ground layer 7 is continuous and extends facing the entire antenna element 3.

The ground layer 7 is able to be in an insulating state, in which it prevents the propagation of the surface wave (generated by the source S) over the front surface 22 or front face of the substrate 2 so as to prevent the antenna element 3 from radiating.

The ground layer 7 is also able to be in a conductive state, in which the ground layer 7 has a ground plane function allowing the transmission of the surface wave over the front surface 22 of the substrate 2, from the source to the conductive patches 4, that is to say to the antenna element 3, so that the antenna element 3 radiates in a direction having a component perpendicular to the front surface 22 of the substrate 20, that is to say a component along the axis z.

The ground layer 7 is able to change from the insulating state to the conductive state through illumination of the ground layer 7 at a wavelength called a switching wavelength λc. It is also able to be kept in the conductive state when the illumination is maintained.

Thus, by optically controlling the ground layer 7 so as to change it from the insulating state to the conductive state, the antenna element 3 is changed from a turned-off state, in which it is unable to radiate under the effect of the radiation from the source S, to a turned-on state, in which it is able to radiate under the effect of the radiation from the source S.

In order to optically control the ground layer 7, the metasurface device 1 advantageously comprises a switching source 8 able to change from a state in which it does not illuminate the ground layer, such that the ground layer 7 is in the insulating state, to a state in which it illuminates the ground layer 7, such that the ground layer 7 changes from the insulating state to the conductive state.

A more precise description will now be given of the first example of the first embodiment of the invention shown in FIGS. 4 and 5. FIG. 4 schematically illustrates a sectional view of the device according to the invention.

The substrate 2 comprises a stack of a plurality of layers comprising the ground layer 7 and an intermediate layer 9 interposed between the conductive patches and the ground layer 7. The intermediate layer 9 has the function of electrically insulating the ground layer 7 from the conductive patches 4.

In the particular embodiment of FIG. 4, the intermediate layer 9 is insulating regardless of the state (first state or second state of the source 8).

The intermediate layer 9 is for example made of a semiconductor that is insulating when it is illuminated at the switching wavelength λc. It is for example made of silicon or of gallium arsenide.

The intermediate layer 9 comprises the front surface 22 of the substrate 2. The front surface 22 of the substrate 2 is in direct physical contact with the conductive patches 4.

The intermediate layer 9 comprises a rear face 23 on which the ground layer 7 is formed, that is to say in direct physical contact with the ground layer 7.

The ground layer 7 comprises the rear face 21 of the substrate 2.

The ground layer 7 is advantageously electrically connected to the coaxial cable C, and more particularly to the shield B.

FIG. 5 shows a rear view of the stack E and of the coaxial cable C. For greater clarity, the mirror 82 is not shown.

The ground layer 7 comprises a photoconductive central portion PC surrounding the channel O and a conductive peripheral portion PF surrounding the photoconductive central portion PC.

The photoconductive central portion PC has the shape of a ring surrounding and delimiting the channel O.

The conductive peripheral portion PF has the shape of a ring surrounding the photoconductive central portion PC.

The conductive peripheral portion PF is joined to the photoconductive central portion PC.

The photoconductive central portion PC is able to be alternately in an insulating state and in a conductive state.

The photoconductive central portion PC is in the insulating state when it is not illuminated.

The photoconductive central portion PC is able to change to the conductive state, in which it is completely conductive, when it is illuminated at the switching wavelength λc through photoconductivity.

The photoconductive central portion PC is made of a semiconductor material such as for example silicon, gallium arsenide GaAs or a two-dimensional material such as for example a transition metal dichalcogenide (TMD) or of an organic semiconductor material.

The conductive peripheral portion PF is for example made of metal or of indium tin oxide (ITO), which is transparent in the visible spectrum.

When the photoconductive central portion PC is in the insulating state, it prevents the propagation of the surface wave over the front surface 22 of the substrate 2 from the source to the antenna element or the conductive patches 4.

When the photoconductive central portion PC is in the conductive state, the ground layer 7 is substantially completely conductive. It is substantially continuously conductive facing the whole of the antenna element 3 or metasurface. The ground layer 7 therefore has a ground plane function allowing the transmission of the surface wave over the front surface 22 of the substrate 2. The antenna element 3 reflects or transforms the surface wave. The antenna element 3 radiates in a direction comprising a component perpendicular to the upper surface 22.

Thus, by optically controlling the photoconductive central portion PC so as to change it from the insulating state to the conductive state, the metasurface device is changed from a turned-off state, in which the antenna element 3 is unable to radiate under the effect of the radiation from the source S, to a turned-on state, in which the metasurface device is able to radiate under the effect of the radiation from the source S.

In order to optically control the photoconductive central portion PC, the metasurface device advantageously comprises the switching source 8, which is able to illuminate the photoconductive central portion PC at the switching wavelength λc so as to change the photoconductive central portion PC from the insulating state to the conductive state, in which the photoconductive central portion PC is substantially completely conductive or is completely conductive. When the illumination of the photoconductive central portion is maintained, the photoconductive central portion is kept in the conductive state.

Advantageously, the switching source 8 is arranged and configured so as to make it possible to emit a light beam that substantially completely illuminates the rear face 25 of the photoconductive central portion PC at the switching wavelength λc so as to change the photoconductive central portion PC to the conductive state or to keep it in said state, in which it is completely conductive.

Rear face 25 of the photoconductive central portion PC is understood to mean that face of the photoconductive central portion PC opposite the intermediate layer 9. The front face 26 of the photoconductive central portion faces the intermediate layer 9.

The switching source 8 comprises for example a laser source 81, for example a vertical-cavity surface-emitting laser (VCSEL) diode or a light-emitting diode.

The switching source 8 comprises for example a mirror 82 for deflecting the optical beam emitted by the laser source 81 such that the optical beam illuminates the desired surface. The optical source comprises for example an optical lens intended to collimate the beam coming from the laser source.

The metasurface device 1 advantageously comprises a control device DC for controlling the switching source 8 so as to change it from a turned-on state, in which it illuminates the photoconductive central portion PC, such that the ground layer 7 is in the conductive state, to a turned-off state, in which it does not illuminate the photoconductive central portion PC, and vice versa.

Figure 6:
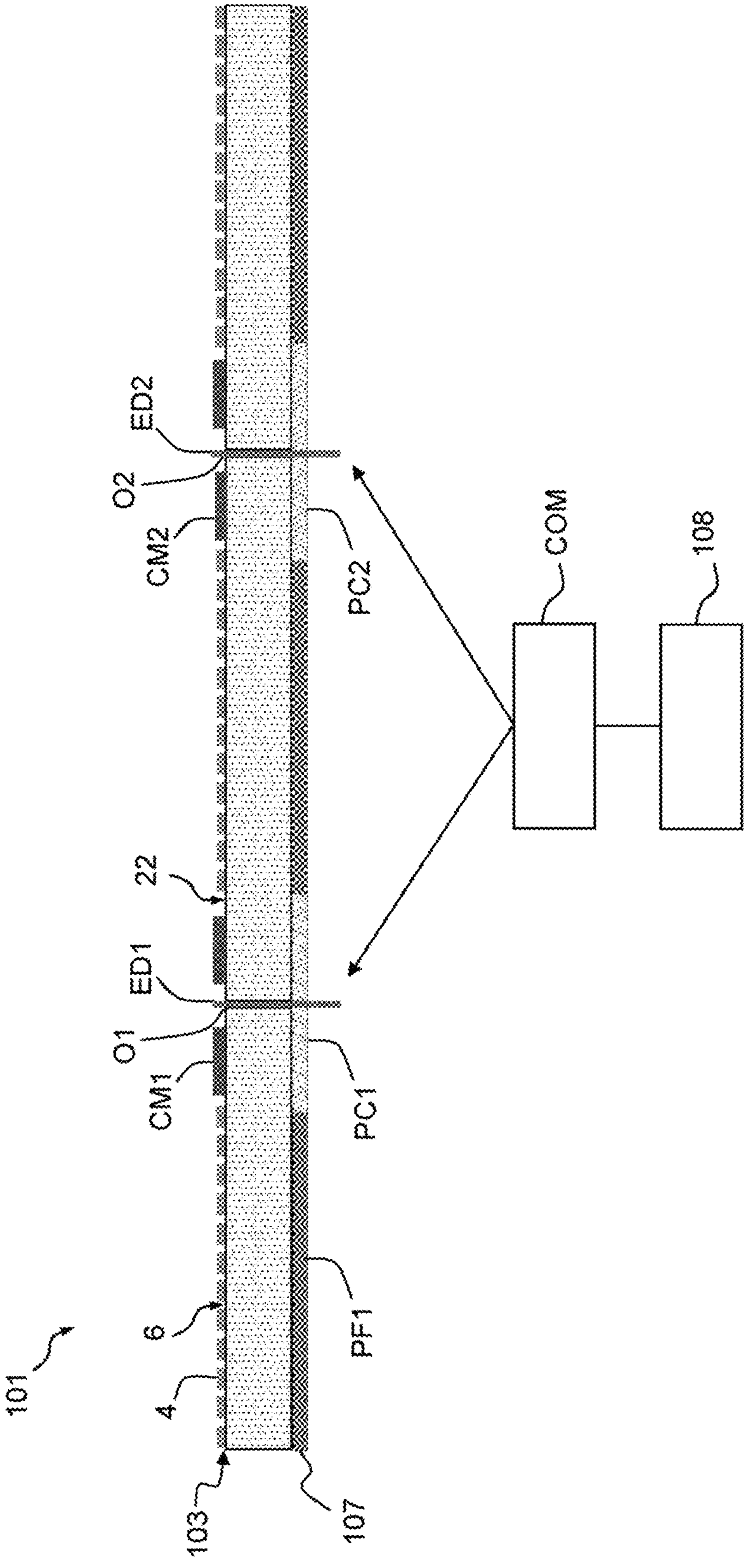

FIG. 6 schematically shows a sectional view of a second example of the first embodiment according to the invention.

In the embodiment of FIG. 6, the metasurface device 101 differs from that of FIG. 4 in that the substrate 122 comprises two channels O1, O2 and in that the metasurface device 101 comprises two electromagnetic-wave sources.

Each electromagnetic-wave source comprises an exposed end ED1, ED2 or monopole, passing through one of the two channels O1, O2, visible in FIG. 6, and facing the conductive patches 4, and is configured and arranged so as to generate surface waves on the front surface 22 of the substrate 2.

Each exposed end belongs to a core of a coaxial, not shown in FIG. 6 for reasons of clarity, just like the source SE Each channel O1, O2 is surrounded by a conductive central ring CM1, CM2.

The antenna element 103 of FIG. 6 differs from that of FIG. 4 in that it is formed around the two channels O1, O2. The two spherical-wave sources ED1, ED2 are able to radiate waves of the same frequency or of different frequency and/or of the same amplitude and/or of different amplitude.

The metasurface device 101 is thus able to radiate a microwave-frequency wave resulting from the recombination of two microwave-frequency waves each generated by the propagation of a surface wave generated by one of the two sources ED1 or ED2 over the front surface 22 of the substrate 2.

The ground layer 107 differs from the ground layer of FIG. 4 in that it comprises two semiconductor photoconductive central portions PC1, PC2 spaced from one another and each surrounding one of the two channels O1, O2. The ground layer 107 also comprises a conductive peripheral portion PF1 surrounding the photoconductive central portions PC1, PC2.

The photoconductive central portions PC1, PC2 each have the shape of a ring surrounding and delimiting one of the two respective channels O1 and O2.

The metasurface device 101 advantageously comprises an optical switch COM for changing the metasurface device 101 from a first state, in which the antenna element 103 is able to radiate under the effect of the radiation from the first spherical-wave source S1 only, to a second state, in which the antenna element 103 is able to radiate under the effect of the radiation from the second spherical-wave source S2 only.

To this end, the metasurface device 101 comprises for example a single switching source 108 generating an optical beam, the optical switch COM being able to deflect this optical beam such that it selectively illuminates only one of the photoconductive central portions out of the photoconductive central portions PC1 and PC2, such that the illuminated photoconductive central portion is conductive and that the ground layer 107 has a ground plane function.

This makes it possible to emit in different directions, thereby making it possible for example to track an object.

As a variant or in addition, the switch COM is able to be in a state in which it selectively illuminates a plurality of photoconductive central areas simultaneously, here the two photoconductive central portions PC1, PC2, such that each illuminated photoconductive central area is completely conductive. The total wave emitted by the source results from the recombination of waves emitted under the effect of the radiation by the various electromagnetic-wave sources ED1, ED2.

The photoconductive portions may be illuminated either on the rear face, as in FIG. 6, or on the front face.

It should be noted that the metasurface device could, as a variant, comprise more than two electromagnetic-wave sources intended to propagate in the form of surface waves over the surface of the substrate and more than two photoconductive central portions each associated with one of the spherical-wave sources.

Figure 7:
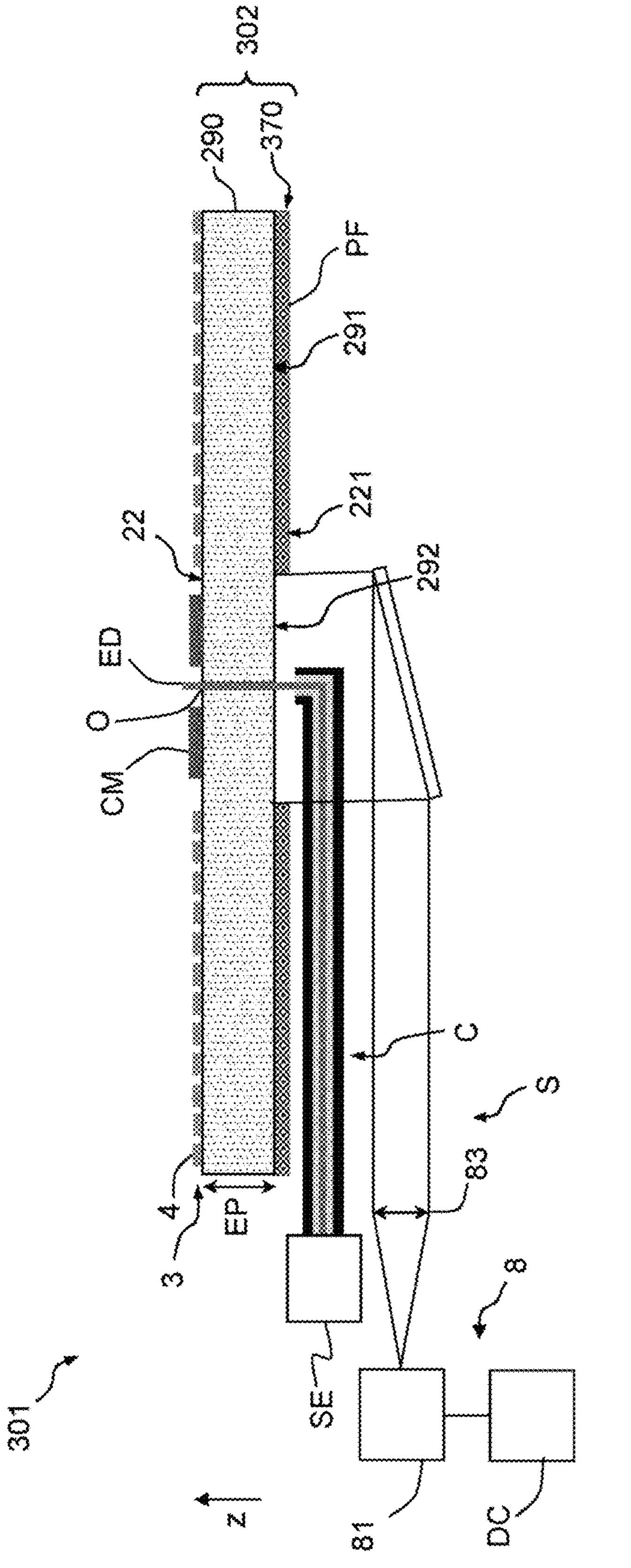

FIG. 7 shows a variant metasurface device 301. The metasurface device 301 differs from that of FIG. 4 in terms of its substrate 302, which differs from the substrate 2 of FIG. 4 in terms of the ground layer 370, which does not have the central portion PC, and in terms of the intermediate layer 290, which is made of photoconductive semiconductor material chosen such that, when the source 8 illuminates the central portion 292 of the rear face 291 of the intermediate layer 290 at the switching wavelength λc, this central portion 292 becomes conductive and the ground layer 370 has the ground plane function. The ground layer 370 comprises the rear face 221 of the substrate 302.

The rear face 291 of the intermediate layer 290 is joined to the ground layer 370.

The central portion 292 connects the channel O to the peripheral portion PF.

The device therefore comprises a ground structure comprising the ground layer 370; comprising only the peripheral portion PF, and the central portion 292 of the rear face 291 of the intermediate layer 290. The thickness EP of the intermediate layer 290 is greater than the depth of penetration of the material forming it, such that the intermediate layer 290 ensures electrical insulation between the ground plane and the conductive patches 4.

Figure 8:
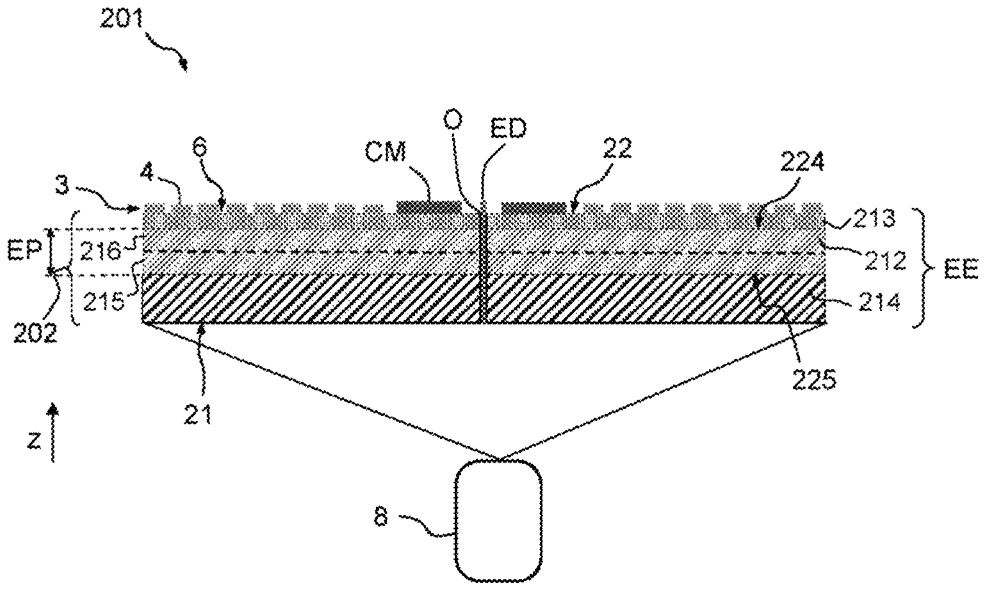

FIG. 8 schematically shows a sectional view of a metasurface device according to a second embodiment of the invention. To simplify this figure, only the exposed end ED of the coaxial cable is shown.

The second embodiment of the invention differs from the first embodiment in that the ground layer is made entirely of a single photoconductive semiconductor material. This photoconductive material is insulating when it is not illuminated and able to be conductive when it is illuminated at the switching wavelength λc.

The photoconductive semiconductor material is for example of the same type as the materials given by way of example for the central conductive portion PC.

More precisely, the metasurface device 201 of FIG. 8 differs from the embodiment of FIG. 4 in that the substrate 202 comprises a first photoconductive layer 212 corresponding to a single layer of a single photoconductive semiconductor material. In other words, the first photoconductive layer 212 is homogeneous. The semiconductor layer 212 is the ground layer.

Advantageously, the metasurface device comprises a photoconductive intermediate layer 213 made of semiconductor material and interposed between the conductive patches 4 and the first photoconductive layer 212.

For example, the first semiconductor layer 212 comprises a front face 224, joined to the photoconductive intermediate layer 213 comprising the front face 22 of the substrate 202, and a rear face 225 opposite the photoconductive intermediate layer 213.

An insulating layer 214 is formed on the rear face 225 of the first photoconductive layer 212. The insulating layer 214 is transparent to the switching wavelength λc. For example, the insulating layer 214 is transparent to optical beams. The insulating layer 214 is for example made of glass, for example of silicon dioxide or borosilicate, which have the advantage of growing easily on silicon.

In the remainder of the text, thickness of a portion of the device is understood to mean its dimension along the axis z of the stack.

The photoconductive semiconductor material of the first photoconductive layer 212 is chosen such that the first photoconductive layer 212 has a depth of penetration, denoted E1, less than the thickness Ep of the first photoconductive layer 212 at the switching wavelength λc, such that, when the entire rear face 225 of the first photoconductive layer 212 is illuminated at the switching wavelength λc, the first photoconductive layer 212 comprises:

- a conductive section 215 forming the ground plane and extending from the rear face 225 of the semiconductor layer 212 over a thickness of the conductive section less than the thickness Ep of the first semiconductor layer 212, and an insulating section 216 extending over the rest of the thickness Ep such that the conductive section 215 is insulated from the conductive patches 4 by the insulating section 216.

The depth of penetration of a material at a predetermined wavelength is equal to the reciprocal of the absorption coefficient of this material at the same wavelength.

Figure 9:
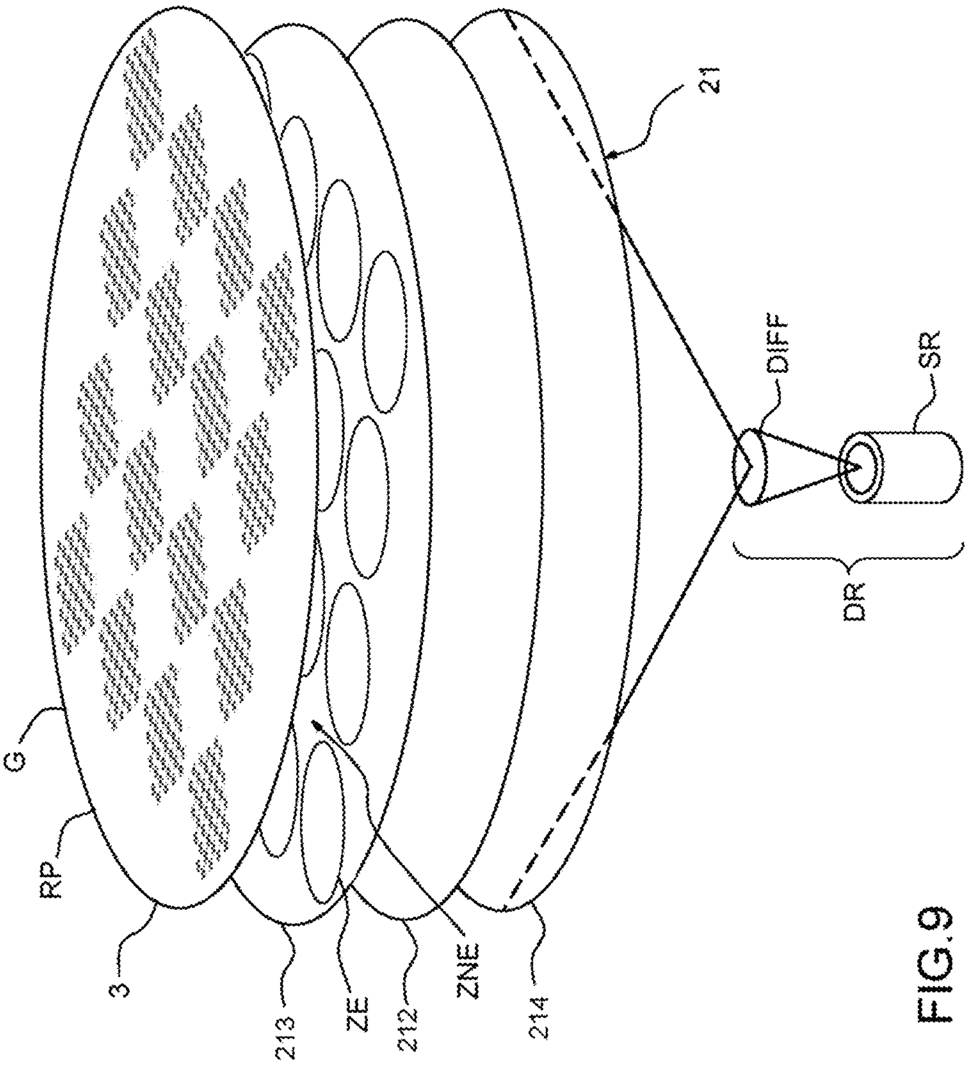

Advantageously, as may be seen in FIG. 9, the metasurface device 201 comprises, in addition to the source S and the switching source 8, visible in FIG. 8 and not shown in FIG. 9 for reasons of clarity, an optical reconfiguration device DR for the antenna element 3, making it possible to optically reconfigure the antenna element 3.

The reconfiguration device DR for the antenna advantageously comprises what is called a reconfiguration source SR, able to emit an optical beam at the reconfiguration wavelength λr, and a diffractive device DIFF, able to illuminate a set of at least one area, called illuminated area ZE, of the intermediate layer 213 such that the intermediate layer 213 is conductive only in the set of at least one illuminated area ZE, so as to electrically connect, in pairs, the metal patches 4 of the antenna element that are separate and connected by a continuous area of the intermediate layer 213 that is located completely within an illuminated area ZE of the set of at least one illuminated area ZE so as to form at least one group G of conductive patches 4 that are electrically connected to one another.

It should be noted that, for greater clarity, only the patches 4 that are electrically connected to one another are shown in FIG. 9. The white areas separating the groups G of conductive patches 4 that are electrically connected to one another comprise conductive patches 4 that are electrically insulated from one another.

Advantageously, the reconfiguration device DR comprises a single optical reconfiguration source SR. The reconfiguration source SR is configured to emit an optical beam at the reconfiguration wavelength λr.

The metasurface device 1 furthermore comprises a diffractive optical device DIFF that makes it possible, using the optical beam emitted by the source SR, through diffraction, to illuminate the set of at least one illuminated area ZE of the connection layer at the reconfiguration wavelength λr.

Advantageously, as in the example of FIG. 5, the diffractive device DIFF makes it possible to illuminate, at the reconfiguration wavelength λr, an array of continuous illuminated areas ZE (or spots) of the layer 213, the illuminated areas ZE being spaced from one another and separated by a non-illuminated area ZNE of the layer 213, such that the layer 213 is conductive only in the illuminated areas ZE. The light spots formed on the layer 213 by the diffractive optical device DIFF, that is to say the illuminated areas ZE, are rounded in shape in the non-limiting example of FIG. 9 but could very well have different shapes.

The illuminated areas ZE of the layer 213 are separated by a non-illuminated area ZNE. The illuminated areas ZE are spaced from one another. This makes it possible to create groups of conductive patches that are electrically connected to one another, the groups being electrically insulated from one another.

As a variant, the array may comprise a set of at least illuminated areas delimiting an array of non-illuminated areas. The illuminated areas are spaced from one another. This makes it possible to create groups of conductive patches that are electrically connected to one another, the groups being electrically connected to one another.

As a variant, the array may comprise at least one illuminated area completely surrounded by a non-illuminated area and at least one non-illuminated area completely surrounded by an illuminated area.

a pitch corresponding to a multiple of the pitch of the array of conductive patches 3.

In the particular embodiment of FIG. 9, each illuminated area ZE comprises a plurality of gaps 6 and/or openings 5, that is to say comprises a group of more than two metal patches 4, such that the illumination of the illuminated area ZE ensures the electrical connection of all of the metal patches 4 of the antenna element 3 that are located in the illuminated area ZE to one another.

As a variant, the diffractive device DIFF is configured so that each illuminated area comprises a single gap 6 or a single opening 5, thus making it possible to connect only two adjacent patches to one another. The solution of FIG. 7 is however easier to implement.

When the reconfiguration device is turned off, the antenna element 4 consists of the elements of the conductive patches 4 that are insulated from one another.

Figure 2:
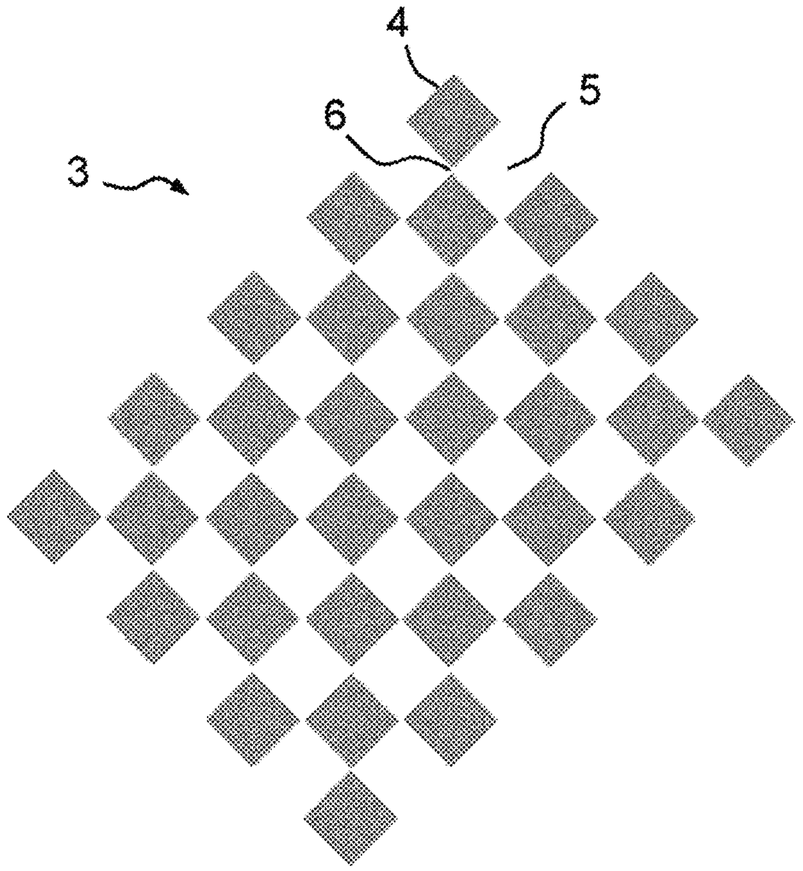

The solution of FIG. 2 therefore makes it possible to modify the radiation law of the antenna by modifying the frequency and/or the orientation of the wave radiated by the antenna element. The modification of the orientation of the radiated wave is equivalent to spatial scanning of the beam radiated by the antenna.

In the embodiment of FIG. 9, the reconfiguration device DR is configured to illuminate the rear face 21 of the substrate 202.

The layer 212 is advantageously made of a photoconductive material transparent to the reconfiguration wavelength λr, which is different from the switching wavelength λc, and the intermediate layer 213 is made of a material transparent to the switching wavelength λc.

Advantageously, materials transparent to respective wavelengths that are spaced from one another are chosen, for example one material that is transparent at 800 nm and has a high absorption coefficient at 1.5 micrometers, and another material that is substantially transparent at 1.5 micrometers and has a high absorption coefficient at 800 nm.

It is possible for example to choose an AsGa ground layer and an intermediate layer made of two-dimensional semiconductor material.

As a variant, the reconfiguration device DR is configured to illuminate the stack EE on the front face. The layer 213 advantageously has a thickness such that the optical beams illuminating the front face 22 of the substrate 20 at the wavelength λr are absorbed completely by the layer 213, thereby making it possible to produce the layer 212 from a material that is absorbent at the wavelength λr.

The thickness of the layer 213 is then advantageously chosen so as to be greater than the depth of penetration of light at the wavelength λr.

The optical reconfiguration of the antenna element uses photoconductivity to make the substrate conductive at the gaps 6 between the conductive patches 4. This optical control has the advantage of being contactless and of being able to be fast. The reconfiguration speed depends primarily on the characteristics of the semiconductor material that is used and of the laser source that is used. It may vary from a few ms to a few ps.

The proposed solution also has the advantage of using a single optical source to reconfigure the antenna by collectively and selectively controlling the areas of the substrate that are located facing the gaps separating the conductive patches so as to make it possible to selectively connect the adjacent conductive patches 4 in pairs. It is relatively simple to implement since it comprises a single optical source for reconfiguring the antenna. It is more reliable than a solution that might comprise one optical source per spot to be created on the intermediate layer.

This optical control ensures independence between the function of reconfiguring the antenna and the radiation of the antenna, the emission of the spherical wave being controlled electrically.

As a variant, the metasurface device of FIG. 8 does not have the photoconductive intermediate layer. It is possible to reconfigure the metasurface device using the reconfiguration device DR through front-face illumination when the switching source 8 illuminates the substrate on the rear face by choosing the wavelengths λr and λc and the thickness of the conductive layer 212 such that the first photoconductive layer 212 comprises an insulating section electrically insulating the illuminated areas ZE that are made conductive by the reconfiguration device DR and the conductive area 216 that is made conductive by the switching source 8.

It should be noted that it is possible to add, to the device of FIG. 4 or of FIG. 6 or 7, a photoconductive semiconductor layer between the intermediate layer 9 and the antenna element 3, such that the photoconductive semiconductor layer has the same function as the layer 213, and a reconfiguration device DR, such as that of FIG. 9, so as to make it possible to reconfigure the metasurface device.

There are many diffractive optical devices DIFF that make it possible to illuminate an array of illuminated areas, such as for example diffractive optical elements (DOE) or optical devices based on a matrix of micromirrors or DMD (digital micromirror device).

Such diffractive optical devices DIFF make it possible to generate, through diffraction, a one-dimensional or two-dimensional array of illuminated areas or non-illuminated areas. The array may be regular or irregular.

The diffractive optical device DIFF may be configured to be able to illuminate, using the beam radiated by the source, a single set of illuminated areas of the conductive layer, such as for example a diffractive optical device DIFF based on a diffractive optical element DOE located at a fixed distance from the source SR and from the layer 213.

The diffractive optical device DIFF may be configured to make it possible to illuminate, using the beam radiated by the source, SR, alternately, various arrays of illuminated areas of the layer 213, each array of illuminated areas being different from the other sets of illuminated areas.

This is for example the case of a diffractive optical device DIFF comprising a matrix of micromirrors or DMD, a control device and a set of actuators making it possible, upon command from the actuator, to individually displace each of the mirrors between a first position, in which it reflects light toward a diffusing lens, and a second position, in which it reflects light toward an absorbent surface, such that the matrix of micromirrors illuminates, using the beam radiated by the reconfiguration source SR, an array of groups of conductive patches 4 that are connected to one another, taken from among a set of predetermined arrays.

The control device comprises for example a memory storing a set of arrays of groups of conductive patches 4 that are connected to one another, taken from among a set of predetermined arrays and associating, with each of these arrays, the position taken from among the first position and the second position, to be occupied by each of the micromirrors such that the matrix of micromirrors illuminates the array under consideration using the beam radiated by the reconfiguration source.

The illuminated continuous areas ZE or the non-illuminated areas may differ for example in terms of their shape and/or their size and/or their orientation in a reference frame tied to the antenna element. Each of the arrays of groups of patches that are electrically connected to one another may be one-dimensional or two-dimensional, periodic or aperiodic.

Other types of reconfiguration devices for metasurface devices are of course conceivable. It is possible for example to arrange switches in the gaps 6, as described in patent application WO2019219708 A1.

Each switch is configured to make it possible to electrically connect two adjacent patches 4 that are separated by a gap 6 to one another.

These switches may be of electrically controlled type, such as for example microelectromechanical systems (MEMS), or of the type comprising a phase change material.

However, the control of unitary switches poses a complex problem with regard to the distribution of electrical control signals, which leads to electromagnetic interference, brought about by the power supply wires, on the radiation pattern of the metasurface device.

The switching and/or reconfiguration wavelengths are for example located in the infrared domain. They are for example between 800 nm and 1500 nm, thereby making it possible to use conventional semiconductor materials such as silicon and gallium arsenide (AsGa). The switching and reconfiguration wavelengths may be located throughout the optical domain. They may for example be located in the ultraviolet domain or the visible. It is possible for example to use two-dimensional semiconductor materials or gallium nitride (GaN).

In the embodiment of FIG. 4, the metasurface device comprises an electromagnetic-wave emission source S, such that the metasurface device is able to radiate an electromagnetic wave. More generally, and in a manner applicable to all of the examples and embodiments, the metasurface device comprises an emission and/or reception device able to emit and/or receive an electromagnetic wave, the emission and/or reception device being configured and arranged such that the electromagnetic wave that it emits or receives is able to propagate in the form of a surface wave over the front surface of the substrate. In the case of a reception device, the antenna element is able to reflect or transform a wave moving in a direction comprising a non-zero component along the axis x so as to transform it into a wave propagating over the front surface of the substrate and received by the reception device, which may comprise a coaxial cable as shown in FIG. 4. The device then comprises means for processing the signal received by the coaxial cable. The emission and/or reception device is intended to operate at a certain wavelength.

The invention claimed is:

1. A metasurface device comprising:

a substrate having a rear surface and a front surface, an emission and/or reception device able to emit and/or receive an electromagnetic wave, the emission and/or reception device being configured and arranged such that the wave is able to propagate in the form of a surface wave over the front surface of the substrate, an antenna element comprising a two-dimensional array of conductive patches arranged on the front surface of the substrate and spaced from one another and having dimensions smaller than the operating wavelength of the emission and/or reception device, the substrate comprising a ground structure able to be in an insulating state, wherein the ground structure prevents the propagation of the surface wave over the front surface of the substrate, from the emission and/or reception device to the conductive patches, or vice versa, and in a conductive state, wherein the ground structure has the ground plane function, allowing the propagation of the surface wave over the front surface of the substrate, from the emission/reception device to the conductive patches, or vice versa, the ground structure being able to change from the insulating state to the conductive state through illumination of the ground structure at a wavelength called a switching wavelength.

2. The metasurface device as claimed in claim 1, comprising a switching source able to change from a state wherein it does not illuminate the ground structure, such that the ground structure is in the insulating state, to a state wherein it illuminates the ground structure, such that the ground structure has the ground plane function.

3. The metasurface device as claimed in claim 2, wherein the substrate comprises a ground layer and an intermediate layer that insulates the ground plane from the conductive patches when the ground structure has the ground plane function, the ground structure comprising a photoconductive central portion (PC) and a conductive peripheral portion (PF) surrounding the photoconductive central portion (PC), the photoconductive central portion (PC) being in an insulating state, when it is not illuminated, wherein it prevents the propagation of the surface wave from the emission and/or reception device to the conductive patches, or vice versa, the photoconductive central portion (PC) being able to be in a conductive state, when it is illuminated at the switching wavelength, wherein the photoconductive central portion (PC) is conductive, such that the ground structure has the ground plane function.

4. The metasurface device as claimed in claim 3, wherein the ground structure is a ground layer, the intermediate layer being interposed between the conductive patches and the ground layer.

5. The metasurface device as claimed in claim 3, wherein the intermediate layer is made of a photoconductive semiconductor material able to be in a conductive state when it is illuminated at the switching wavelength, the intermediate layer being interposed between the conductive patches and the conductive peripheral portion, the photoconductive central portion comprising a central portion of a rear face of the intermediate layer, the rear face of the intermediate layer being in direct physical contact with the conductive peripheral portion.

6. The metasurface device as claimed in claim 3, comprising a plurality of switching sources, the ground structure comprising a plurality of photoconductive central portions and a switch (COM) for selectively illuminating only one of the photoconductive central portions taken from among the photoconductive central portions and/or for simultaneously and selectively illuminating a plurality of photoconductive central portions.

7. The metasurface device as claimed in claim 1, wherein the ground structure is a first photoconductive layer made of a single photoconductive semiconductor material, the photoconductive material being insulating when it is not illuminated and conductive when it is illuminated at the switching wavelength.

8. The metasurface device as claimed in claim 7, wherein the photoconductive semiconductor material forming the first photoconductive layer is chosen such that the first photoconductive layer has a depth of penetration less than the thickness of the first photoconductive layer at the switching wavelength, such that, when the entire rear face of the first photoconductive layer is illuminated at the switching wavelength by the switching source, the first photoconductive layer comprises:

a conductive section forming the ground plane and extending from the rear face of the semiconductor layer over a thickness less than the thickness of the first semiconductor layer, and an insulating section extending over the rest of the thickness of the semiconductor layer such that the conductive section is insulated from the conductive patches by the insulating section.

9. The metasurface device as claimed in claim 1, comprising a semiconductor intermediate layer, the metasurface device comprising an optical reconfiguration device (DR) comprising what is called a reconfiguration source (SR) emitting an optical beam and a diffractive optical device (DIFF) able to illuminate a set of at least one area, called illuminated area, of the intermediate layer such that the intermediate layer is conductive only in the set of at least one illuminated area (ZE), so as to electrically connect, in pairs, the metal patches of the antenna element that are separate and connected by a continuous area of the semiconductor intermediate layer that is located completely within an illuminated area (ZE) of the set of at least one illuminated area (ZE) so as to form at least one group (G) of conductive patches that are electrically connected to one another.

10. The metasurface device as claimed in claim 9, wherein the intermediate layer is interposed between the ground layer and the conductive patches or wherein the intermediate layer is the ground layer.

* * * * *